(12) United States Patent
Sculley, II et al.

(10) Patent No.: US 8,788,442 B1
(45) Date of Patent: Jul. 22, 2014

(54) COMPLIANCE MODEL TRAINING TO CLASSIFY LANDING PAGE CONTENT THAT VIOLATES CONTENT ITEM DISTRIBUTION GUIDELINES

(75) Inventors: David W. Sculley, II, Pittsburgh, PA (US); Bridget Spitznagel, Pittsburgh, PA (US); Zach Paine, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 13/195,172

(22) Filed: Aug. 1, 2011

Related U.S. Application Data

(60) Provisional application No. 61/428,254, filed on Dec. 30, 2010.

(51) Int. Cl.
*G06N 3/04* (2006.01)

(52) U.S. Cl.
USPC .............................................. 706/20; 706/25

(58) Field of Classification Search
USPC ........................................................... 706/20
See application file for complete search history.

(56) References Cited

U.S. PATENT DOCUMENTS

2008/0120154 A1 * 5/2008 Dellovo ............................ 705/7

OTHER PUBLICATIONS

Gibson et al., Adaptive Web-page Content Identification. [online], 2007 [retrieved on Jul. 25, 2013]. Retrieved from the Internet:<URL:http://citeseerx.ist.psu.edu/viewdoc/summary?doi=10.1.1.99.5823>.*

* cited by examiner

*Primary Examiner* — Jeffrey A Gaffin
*Assistant Examiner* — Nathan Brown, Jr.
(74) *Attorney, Agent, or Firm* — Leason Ellis LLP

(57) ABSTRACT

Methods, systems, and apparatus, including computer programs encoded on a computer storage medium, for analyzing content item compliance with specified guidelines. In one aspect, a method includes receiving training data that specify manual classifications of content items and feature values for each of the content items, where each manual classification specifies whether the content item is a violating content item. Using the training data, a compliance model is trained to classify an unclassified content item as a violating content item based on the feature values of the unclassified content item. A determination is made that the compliance model has an accuracy measure that meets a threshold accuracy measure. In response to determining that the accuracy measure for the compliance model meets the accuracy threshold, unclassified content items are classified using the feature values for the unclassified content items, and data specifying the classifications are provided.

21 Claims, 4 Drawing Sheets

COMPLIANCE MODEL TRAINING TO CLASSIFY LANDING PAGE CONTENT THAT VIOLATES CONTENT ITEM DISTRIBUTION GUIDELINES

CROSS-REFERENCE TO RELATED APPLICATIONS

This application claims the benefit under 35 U.S.C. §119(e) of U.S. Patent Application No. 61/428,254, entitled "CONTENT ITEM COMPLIANCE ANALYSIS," filed Dec. 30, 2010, which is incorporated herein by reference in its entirety.

BACKGROUND

This specification relates to data processing and quality assessment.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

When a web page (or another resource) is requested by a user, an advertisement request is generated and transmitted to an advertisement management system that selects advertisements for presentation in the advertisement slots. The advertisement management system selects advertisements, for example, based on characteristics of the web page with which the advertisements will be presented, demographic information about the user to whom the advertisements will be presented, and/or other information about the environment in which the advertisement will be presented.

The advertisements that are provided in response to an advertisement request can be required (e.g., according to terms of use) to comply with a set of advertising guidelines. These advertising guidelines may specify, for example, content that can be included in advertisements and content that cannot be included in the advertisements. An example advertisement guideline may specify that an advertisement cannot include misleading or inaccurate claims. For example, an advertisement that claims that a user can make $500,000 a year by simply sending the advertiser $50 is likely to be in violation of the advertising guidelines.

Generally, advertising effectiveness and/or user satisfaction increases when the quantity of violating advertisements (i.e., advertisements that violate the advertising guidelines) is reduced. However, it can be difficult to identify violating advertisements for several reasons. For example, determining that advertisements are violating advertisements may be a somewhat subjective determination because the determination may require an analysis of whether statements in the advertisements are misleading. Additionally, identification of a violating advertisement may require analysis of a landing page to which the advertisement redirects users, and these landing pages can change over time, such that an advertisement may not initially be a violating advertisement, but may later become a violating advertisement based on changes made to the landing page.

SUMMARY

In general, one innovative aspect of the subject matter described in this specification can be embodied in methods that include the actions of receiving training data that specify manual classifications of content items and feature values for each of the content items, the manual classification for each of the content items specifying whether the content item is a violating content item that violates content item distribution guidelines, the feature values specifying one or more characteristics of the content items and characteristics of landing pages to which the content items link; training a compliance model using the training data, the compliance model being trained to classify an unclassified content item as a violating content items based on the feature values of the unclassified content item; determining that the compliance model has an accuracy measure that meets a threshold accuracy measure; in response to determining that the accuracy measure for the compliance model meets the accuracy threshold, classifying unclassified content items using the feature values for the unclassified content items; and providing data specifying the classifications of the unclassified content items. Other embodiments of this aspect include corresponding systems, apparatus, and computer programs, configured to perform the actions of the methods, encoded on computer storage devices.

These and other embodiments can each optionally include one or more of the following features classifying unclassified content items can include the action of classifying at least one unclassified content item as a suspicious content item. Methods can further include the actions of providing the suspicious content item to a rater for manual classification; receiving data specifying a manual classification of the suspicious content item; and updating the compliance model using the manual classification and the feature values of the suspicious content item.

Receiving data specifying a manual classification can include the action of receiving data specifying that the suspicious content item is a violating content item or a complying content item. Methods can further include the actions of determining an updated accuracy measure for the updated compliance model; determining that the updated accuracy measure meets the accuracy measure for the compliance model; and in response to determining that the updated accuracy measure meets the accuracy measure, classifying content items using the updated compliance model.

Determining that the compliance model has an accuracy measure that meets a threshold accuracy measure can include the actions of determining that the compliance model has a precision measure that meets a precision threshold; and determining that the compliance model has a recall measure that meets a recall threshold. Determining that the updated accuracy measure meets the accuracy measure for the compliance model can include the actions of determining that an updated precision measure for the updated compliance model meets the precision measure for the compliance model; and determining that an updated recall measure for the updated compliance model meets the recall measure for the compliance model.

Methods can further include the actions of determining an updated accuracy measure for the updated compliance model; determining that the updated accuracy measure does not meet the accuracy measure for the compliance model; and in response to determining that the updated accuracy measure does not meet the accuracy measure, classifying content items using the compliance model.

Determining that the compliance model has an accuracy measure that meets the threshold accuracy measure can include determining that the compliance model has at least a minimum area under the curve measure. Determining that the compliance model has an accuracy measure that meets the threshold accuracy measure can include determining that the compliance model has at least a minimum precision measure and at least a minimum recall measure.

Training a compliance model can include the action of training a separate model for each of two different rules that are specified by the content distribution guidelines, each separate model being trained to classify the unclassified content item as a violating content item for one of the two different rules. The content items can be advertisements that have been submitted for distribution by an advertisement management system and the landing pages can be web pages to which the advertisements redirect users that interact with the advertisements. Methods can further include the action of preventing distribution of violating content items.

Particular embodiments of the subject matter described in this specification can be implemented so as to realize one or more of the following advantages. Online content that violates one or more terms of use or distribution guidelines (collectively referred to as distribution guidelines) can be automatically identified, and the distribution of this violating content can be restricted. The models used to classify online content can be iteratively updated using manual classifications of online content that the model did not identify as complying with or violating the distribution guidelines. Online content can be periodically reclassified so that the online content can be classified based on the current version of the online content. Violating content can be identified more quickly by periodically classifying the content items with updated models. The accuracy of an updated model can be required to have at least the same accuracy as a prior version of the model so that classification accuracy is not sacrificed by using the updated model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
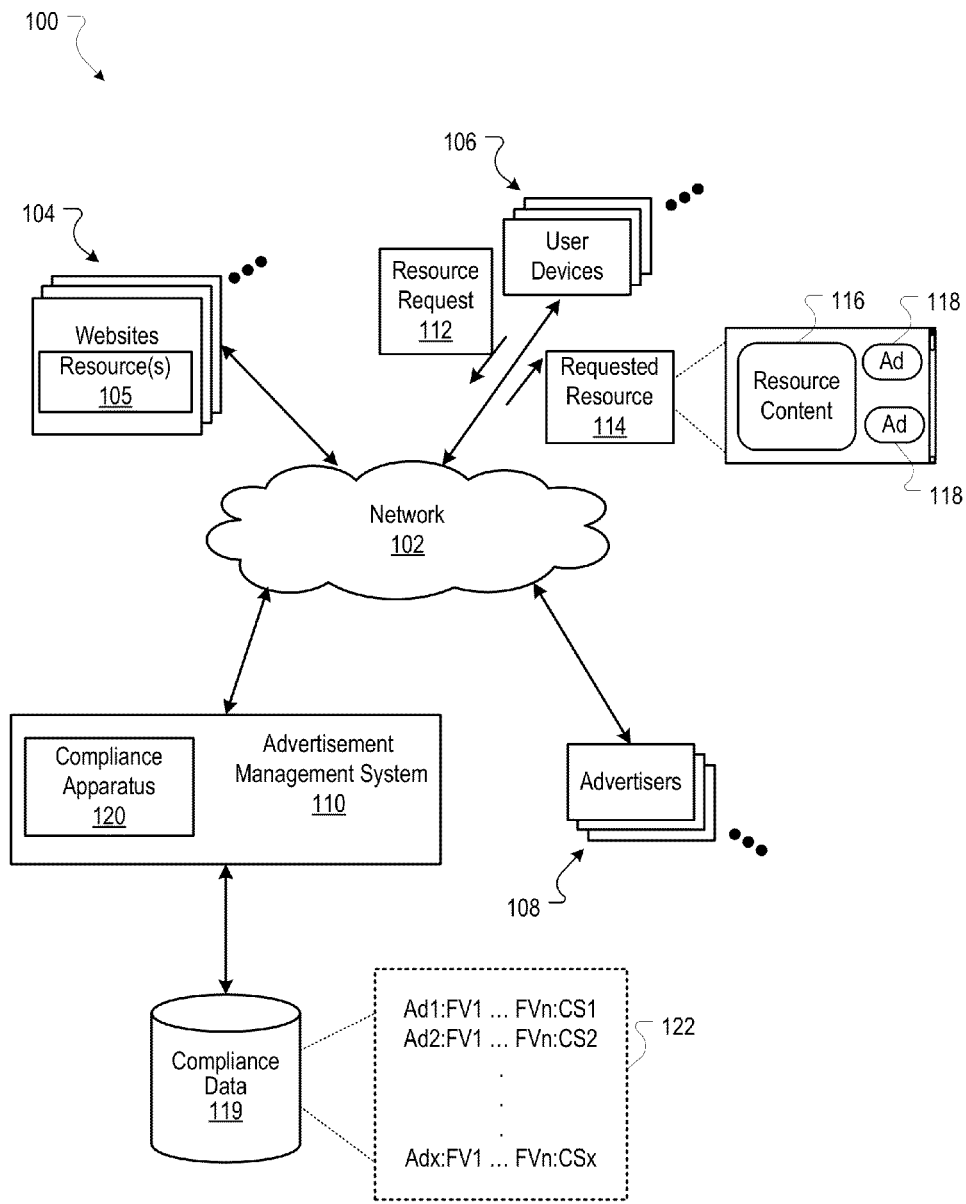
FIG. 1 is a block diagram of an example environment in which an advertisement management system manages advertising services.

Compliance with content item distribution guidelines (e.g., terms of service and/or advertisement distribution guidelines) is evaluated using a set of models that evaluate content item compliance based on feature values for the content items. Feature values are numerical representations of content item features and/or characteristics. For example, feature values can be values that represent a quantity of a particular feature of an advertisement and/or web page (e.g., a quantity of out-links, a quantity of particular words, a quantity of images, etc.), a value that represents a particular state of a feature (e.g., a background of a particular color or the presence of animated elements, the presence of a particular phrase), or values that represent image pixels.

A content item is a unit of content that is presented with a resource. Advertisements are used throughout this document as examples of content items for which compliance with distribution guidelines is evaluated. However, the description that follows is also applicable to other types of content items. For example, the apparatus and processes described below can be used to determine whether blog posts, content posted to a social network, e-mail contents, audio and/or video content posted to a file sharing site are in compliance with respective distribution guidelines (or terms of service).

As described in more detail below, compliance models (i.e., models with which content item compliance is evaluated) are trained to classify content items as violating content items (e.g., violating advertisements), suspicious content items (e.g., suspicious advertisements), or complying content items (e.g., complying advertisements). Violating content items are content items that have been identified as being in violation of at least one content item distribution guideline. Suspicious content items are content items that may be in violation of a content item distribution guideline. Complying content items are content items that have been identified as not being in violation of any distribution guidelines.

The models are initially trained using training data that specify manual classifications of content items and feature values that are associated with the content items (e.g., characteristics of the respective advertisements and characteristics of respective landing pages for the respective advertisements). Once trained, the models are used to classify content items, and content items that are classified by the models as suspicious are sent for manual classification. The manual classifications of the suspicious content items are periodically used to update the models. This classification and update process can iteratively continue so that the models continue to be trained based on additional manual classification data.

In some implementations, a separate model can be used to evaluate each distribution guideline (i.e., each rule) with which a content item must comply. For example, one model can be used to determine whether an advertisement is misleading, while another model can determine whether an advertisement is promoting the sale of an item that can be obtained free of charge, and still another model can determine whether an advertisement is promoting counterfeit goods.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 at the user device. The data representing the requested resource 114 can also include data specifying a portion of the resource or a portion of a user display (e.g., a presentation location of a pop-up window or in a slot of a web page) in which advertisements can be presented. These specified portions of the resource or user display are referred to as advertisement slots 118.

When a resource 105 is requested by a user device 106, the advertisement management system 110 receives a request for advertisements to be provided with the requested resource 114. The request for advertisements can include characteristics of the advertisement slots that are defined for the requested resource 114, and can be provided to the advertisement management system 110.

For example, a reference (e.g., URL) to the requested resource 114 for which the advertisement slot is defined, a size of the advertisement slot, and/or media types that are eligible for presentation in the advertisement slot can be provided to the advertisement management system 110. Similarly, keywords associated with a requested resource ("resource keywords") can also be provided to the advertisement management system 110 to facilitate identification of advertisements that are relevant to the requested resource 114.

Based on data included in the request for advertisements, the advertisement management system 110 selects advertisements that are eligible to be provided in response to the request ("eligible advertisements"). For example, eligible advertisements can include advertisements having characteristics matching the characteristics of the advertisement slots 118 and that are identified as relevant to specified resource keywords. In some implementations, advertisements having targeting keywords that match the resource keywords are selected as eligible advertisements by the advertisement management system 110.

The eligible advertisements can also be limited to advertisements that have been determined to be in compliance with advertisement distribution guidelines (i.e., complying advertisements). Advertisement distribution guidelines are a set of rules with which advertisers are required to comply in exchange for having their advertisements distributed by the advertisement management system 110. The advertisement distribution guidelines may require that advertisements not include explicit content (e.g., adult content, violent content, or other content that are deemed objectionable), that advertisements not promote for sale items that are otherwise available free of charge, that advertisements not promote counterfeit goods, that advertisements not be misleading or fraudulent.

The advertisement management system 110 includes a compliance apparatus 120 that determines whether advertisements (or other content items) are in compliance with the advertisement distribution guidelines. In some implementations, the compliance apparatus 120 trains compliance models using training data 122 that specify advertisement identifiers (Ad1 . . . Adx) and feature values (FV1 . . . FVn) for the respective advertisements. The feature values for the advertisements are values that specify various characteristics of the advertisements. For example, feature values for advertisements can specify a category or topic to which content of the advertisement is directed, targeting keywords for the advertisement, resource keywords for the landing page to which the advertisement links, sizes of images that are included in the advertisement and/or presented on the landing page, a dwell time measure that characterizes lengths of user visits to the landing page, and/or a quality measure for the landing page.

The training data 122 also include compliance status data (CS1 . . . CSx) that specify whether each of the respective advertisements is a complying advertisement (i.e., an advertisement that is in compliance with the advertisements distribution guidelines), a violating advertisement (i.e., an advertisement that is not in compliance with at least one of the advertisements distribution guidelines), or a suspicious advertisement (i.e., an advertisement is classified as not being a complying advertisement and not being a violating advertisement). The compliance status data (CS1 . . . CSx) can specify, for a violating advertisement, one or more rules from the advertisement distribution guidelines that are violated by violating advertisement. For example, the compliance status data can specify that a violating advertisement is misleading and/or that a violating advertisement is promoting counterfeit goods.

In some implementations, the compliance status data that are used as training data 122 are only the compliance status data that are associated with (i.e., indexed according to and/or stored with a reference to) manually classified advertisements. When the training data 122 are restricted to compliance status data for manually classified advertisements, the compliance apparatus 120 trains the compliance models using only advertisement classifications that were selected by humans (i.e., subjectively classified advertisements). Thus, the compliance models are trained to represent relationships between subjective human classifications of the advertisements and feature values (FV1 . . . FVn) for the advertisements.

Figure 2:
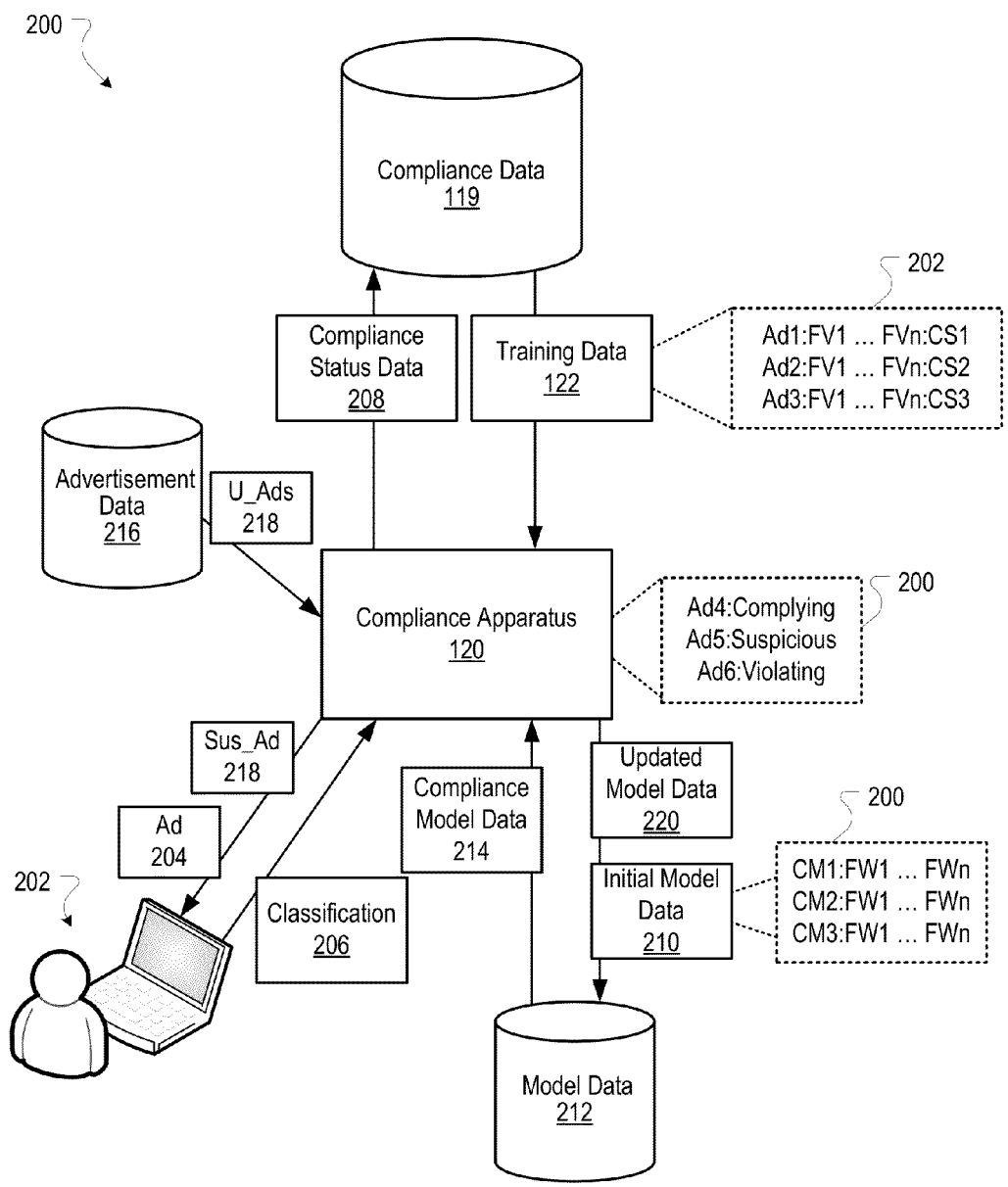
FIG. 2 is a block diagram illustrating an example data flow for training and updating compliance models.

FIG. 2 is a block diagram illustrating an example data flow 200 for training and updating compliance models. In some implementations, the compliance apparatus 120 begins by collecting compliance data from raters 202 (i.e., human evaluators that utilize a user device to view and classify advertisements). For example, the compliance apparatus 120 can provide an advertisement 204 to a rater 202 and request that the rater 202 determine whether the advertisement 204 is a complying advertisement or a violating advertisement. In response to receiving the advertisement 204, the rater 202 can provide a classification 206 of the advertisement to the compliance apparatus 120. The compliance apparatus 120 can iteratively provide the advertisement 204 (and many other advertisements) to many different raters 202 and receive back a classification 206 from each of the raters 202.

Raters are described as humans throughout this document, but in some implementations, one or more different types of models or other automated classification techniques may be used to separately classify the suspicious content items. In these implementations, the classification data would not be "manually selected," but would be alternative classifications that could be used in conjunction with, or instead of, the classifications by the compliance apparatus 120.

The compliance apparatus 120 can analyze the classifications 206 of the advertisement 204, and determine whether the advertisement 204 is a complying advertisement or a violating advertisement. In some implementations, the determination can be made using a single classification 206 from a single rater 202. In some implementations, the determination can made based on multiple classifications 206 that are received from multiple different raters 202.

For example, the compliance apparatus 120 can determine that the advertisement 204 is a violating advertisement if the portion of the raters that classified the advertisement as a violating advertisement exceeds a violating threshold (e.g., 60%). Similarly, the compliance apparatus 120 can determine that the advertisement 204 is a complying advertisement if the portion of the raters that classified the advertisement as a complying advertisement exceeds a complying threshold (e.g., 80%). Other analysis techniques (e.g., other statistical analyses) can be used to analyze the classifications 206.

In some implementations, the compliance apparatus 120 can restrict the available classifications for an advertisement to "violating" or "complying" so that raters are required to classify an advertisement as either "violating" or "complying." In some implementations, the compliance apparatus 120 can include "suspicious" as an available classification, so that raters can also classify advertisements as "suspicious."

When the available classifications are restricted to "violating" and "complying," the compliance apparatus can use statistical analysis and/or thresholds to determine whether advertisements are violating advertisements or complying advertisements. When "suspicious" is an available classification for raters, the compliance apparatus 120 can consider a classification of "suspicious" the same as a classification of "violating," as a weighted classification of "violating" (e.g., each "suspicious" classification can be treated as ½ or 1/10 of a "violating" classification), or ignore classifications of "suspicious" for purposes of analyzing the classifications 206.

Once the compliance apparatus 120 has analyzed the classifications 206 for the advertisement 204, the compliance apparatus 120 generates compliance status data 208 for the advertisement 204 and stores the compliance status data 208 in the compliance data store 119. The compliance apparatus 120 can index the compliance status data 208 according to the advertisement identifier representing the particular advertisement.

Once compliance status data 208 have been collected for a set of advertisements, the compliance apparatus 120 obtains training data 122 with which one or more compliance models are initially trained. The compliance model 120 can obtain the training data 122 from the compliance data store 119.

The training data 122 typically includes a set of advertisement data 202 for a set of advertisements. The set of advertisement data 202 can include advertisement identifiers (e.g., Ad1 ... Ad3), a set of feature values (FV1 ... FVn) that are associated with (i.e., indexed according to and/or stored with a reference to) each of the advertisement identifiers, and compliance status data (e.g., CS1 ... CS3) that are associated with each of the advertisement identifiers and/or corresponding feature values. As described above, compliance status data are data that specify whether an advertisement is a violating advertisement, a suspicious advertisement, or a complying advertisement. The compliance apparatus 120 can use one of many different machine learning techniques to train the compliance models using the training data 122. For example, the compliance apparatus 120 can utilize a vector support machine that creates a classification model using the training data 122.

Models that classify advertisements can be created, for example, by mathematically modeling relationships between the feature values of advertisements and the compliance status data for the advertisements, as described in more detail below. Once a model has been created, the model can be tested on a hold-out set of training data (i.e., a set of training data that were not used to create the model) to determine an accuracy measure (e.g., an area under the curve measure) for the model. If the accuracy of the model does not meet a minimum accuracy threshold, the model can continue to be iteratively trained and tested until the accuracy of the model meets the minimum accuracy threshold. The resulting model can be, for example, a vector of feature weights that specify a relative importance of each feature value of an advertisement for classifying the advertisement as a violating advertisement or a complying advertisement. Once the model has been trained, initial model data 210 that represent the compliance model (e.g., the vector of feature weights (FW1 ... FWn)) are stored in a model data store 212. As noted above, a separate compliance model can be trained for each rule with which advertisements must comply.

The compliance apparatus 120 can request, access, or otherwise obtain compliance model data 214 from the model data store 212. The compliance model data 214 represent a model that has been trained to classify unclassified advertisements (U_Ads) 218. The unclassified advertisements 218 can be, for example, advertisements that have been submitted by advertisers for distribution by the advertisement management system 110 of FIG. 1. The unclassified advertisements 218 can be stored, for example, in an advertisement data store 216. The advertisement data store 216 can include, for example, advertisement identifiers, feature values for the advertisements, uniform resource locators to which the advertisements are linked, and/or other information associated with the advertisements.

The compliance apparatus 120 can obtain unclassified advertisements 218 (e.g., all data associated with the unclassified advertisements or a subset of the data that is used to classify ads) from the advertisement data store 216. In turn, the compliance apparatus 120 can use the compliance model data 214 (e.g., a vector of feature weights) to classify each of the unclassified advertisements 218 as a complying advertisement, a violating advertisement, or a suspicious advertisement. For each of the violating advertisements and complying advertisements, the compliance apparatus 120 stores compliance status data 208 in the compliance data store 119 and/or the advertisement data store 216.

Advertisements that are not classified as complying advertisements and are not classified as violating advertisements are classified as suspicious advertisements. When an advertisement is classified as a suspicious advertisement, the compliance apparatus 120 transmits the suspicious advertisement (Sus_Ad) 218 to a rater 202 (or multiple raters). In response to receiving the suspicious advertisement 218, the rater 202 classifies the suspicious advertisement 218 and submits to the compliance apparatus 120 a classification 206 of "violating" or "complying." In turn, the compliance apparatus 120 stores compliance status data 208 specifying the classification of the suspicious advertisement 218 in the compliance data store 119.

In some implementations, the compliance apparatus 120 also uses the compliance data 208 that are obtained from the classifications 206 (i.e., manual classifications) of suspicious advertisements and feature values of the suspicious advertisements as additional training data to update the compliance model. For example, the compliance apparatus 120 can use the additional training data to adjust the feature weights of the compliance model and then compute an updated accuracy measure for the model. As described in more detail below, the updated accuracy measure can be used to determine whether the updated compliance model is used to classify advertisements, or whether the previous version of the compliance model will continue to be used. When the updated compliance model is selected to be used, the compliance apparatus 120 stores updated model data 220 in the model data store 212 and continues to classify unclassified advertisements and/or reclassify previously classified advertisements using the updated model data 220. In some implementations, each compliance model is updated periodically (e.g., every N hours or after X classifications 206 for suspicious advertisements are received).

Figure 3:
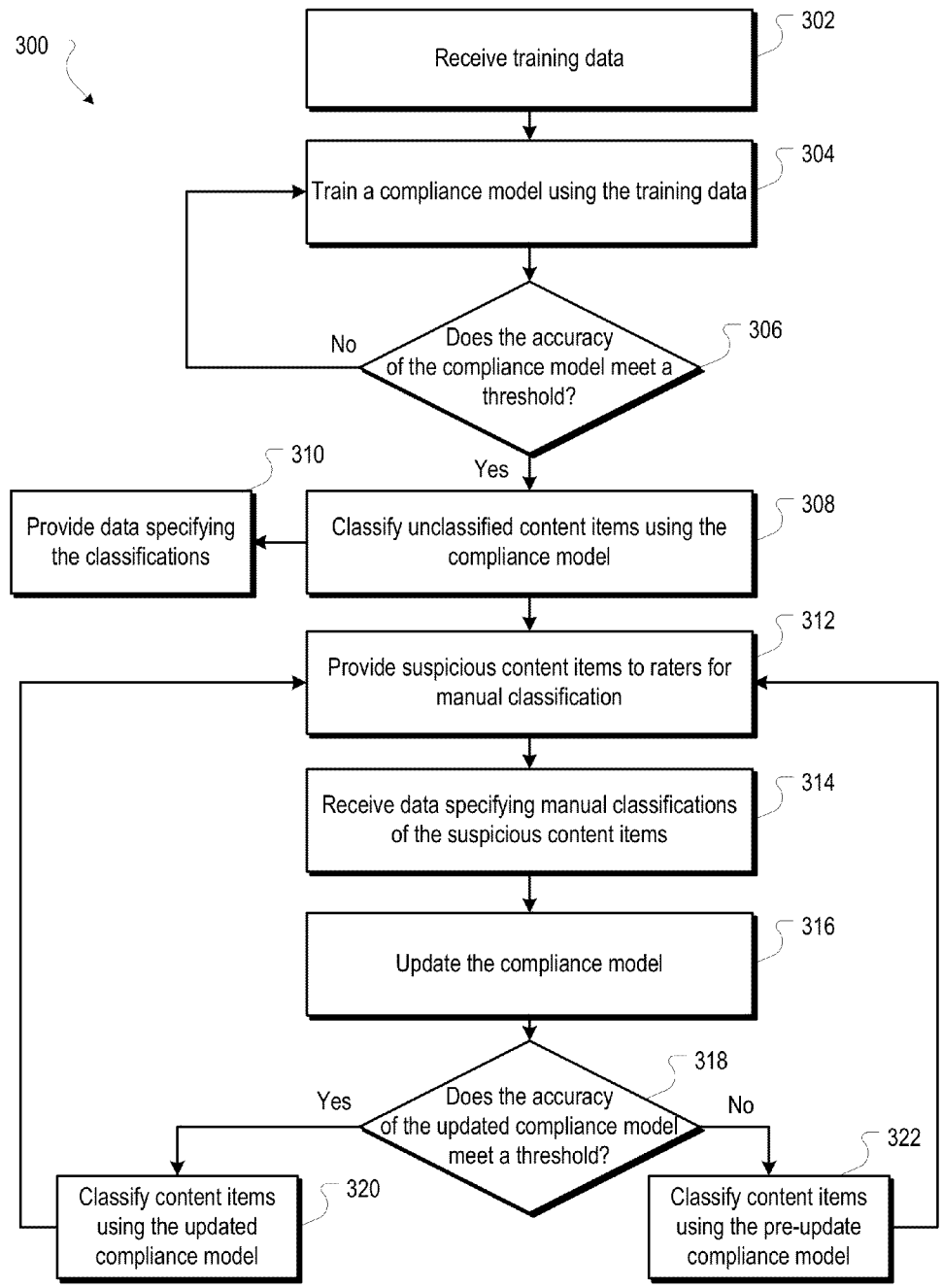
FIG. 3 is a flow chart of an example process or training and updating a compliance model.

FIG. 3 is a flow chart of an example process 300 for training and updating a compliance model. The process 300 is a process by which a compliance model is trained using received training data. An accuracy measure is determined for the compliance model. If the accuracy of the compliance model fails to meet an accuracy threshold, the compliance model continues to be trained. If the accuracy of the compliance model does meet the accuracy threshold, the compliance model is used to classify unclassified content items. Data specifying the classifications are provided, and content items that are classified as suspicious are provided to raters for manual classification. Data specifying the manual classifications are received, and the compliance model is updated using the manual classifications. A determination is made whether the accuracy of the updated compliance model meets the accuracy of the compliance model. If the accuracy of the updated compliance model meets the accuracy of the compliance model, the updated compliance model is used to classify content items. Otherwise, the compliance model continues to be used to classify content items.

The process 300 can also be used to train and/or update compliance models that classify a wide range of content items (e.g., advertisements, video content, audio content, gaming content, social network content, or other content items). The process 300 can be implemented, for example, using the compliance apparatus 120 and/or advertisement management system 110 of FIG. 1. The process 300 can also be implemented as instructions stored on computer storage medium such that execution of the instructions by data processing apparatus cause the data processing apparatus to perform the operations of the process 300.

Training data are received (302). In some implementations, the training data specify manual classifications of respective content items and feature values for each of the respective content items. For example, the training data can include compliance status data that specify, for each of the respective content items, whether the respective content item is a violating content item (i.e., a content item that violates content item distribution guidelines).

The feature values that are specified by the training data specify, for each of the respective content items, one or more characteristics of the respective content item. For example, the feature values for each content item can specify a category or topic to which content of the advertisement is directed, targeting keywords for the advertisement, resource keywords for the landing page to which the advertisement links, sizes of images that are included in the advertisement and/or presented on the landing page, a dwell time measure that characterizes lengths of user visits to the landing page, and/or a quality measure for the landing page. The feature values can also include values that represent quantities of particular elements (e.g., animated elements, phrase occurrences, or images).

A compliance model is trained using the training data (304). In some implementations, the compliance model is trained to classify an unclassified (or previously classified) content item based on the feature values of the unclassified content item. The compliance model can classify the unclassified content item as a violating content item, a complying content item, or a suspicious content item based on the feature values of the unclassified content item.

In some implementations, a separate compliance model can be trained for each rule that is specified by the content distribution guidelines. Each of the separate compliance models will be trained using feature values and compliance status data for content items that were manually classified as violating the rule for which the separate compliance model is being trained. Thus, each of the separate compliance models will be trained to classify content items as violating content items for a particular rule.

The compliance model can be trained, for example, using a support vector machine (SVM) technique that identifies relationships between the feature values of content items and the manual classifications of the content items. The compliance model can be represented, for example, by a vector of feature weights in which each feature weight represents a relative importance for classifying a content item. A dot product of the vector of feature weights and the feature values of a content result in a value with which the content item can be classified.

Compliance model training can begin, for example, by initializing the values of the feature weights to default values. In some implementations, each of the feature values is set to a same default value (e.g., 1.0). In some implementations, the feature values can individually set to different respective default values (e.g., the values of a previously trained compliance model). Once the compliance model has been initialized, the training data are used to adjust the feature weights of the compliance model according to the selected training technique (e.g., SVM, linear regression, or another modeling technique).

Once the feature weights of the compliance model have been adjusted, a determination is made whether the compliance model has an accuracy measure that meets a threshold accuracy measure (306). In some implementations, the determination of whether the accuracy measure meets a threshold accuracy measure is made by determining whether the compliance has an area under the curve measure that is not less than a threshold area under the curve measure.

In some implementations, the determination of whether the accuracy measure meets a threshold accuracy measure is made by determining whether the compliance model has a precision measure that meets a precision threshold. The precision measure can be specified, for example, as a minimum acceptable ratio of the quantity of true positive classifications relative to the quantity of total positive classifications (i.e., (quantity of true positive classifications)/(quantity of true positive classifications+quantity of false positive classifications)). For example, when the compliance model is trained to classify content items as violating content items or complying content items, the precision measure can be computed as a ratio of the quantity of violating content items that are classified as such by the model relative to the total quantity of content items that were classified as violating content items.

The determination of whether the accuracy measure meets the threshold accuracy measure can optionally, or additionally, include determining whether a recall measure (i.e., (quantity of true positive classifications)/(quantity of true positive classifications+quantity of false negative classifications)) for the compliance model meets a recall threshold. The recall threshold can be specified, for example, as a minimum acceptable ratio of the quantity of true positive classifications relative to a sum of the quantity of true positive classifications and the quantity of false negative classifications. For example, when the compliance model is trained to classify content items as violating content items or complying content items, the recall measure can be computed as a ratio of the quantity of violating content items that are classified as such by the model relative to a total quantity of the violating content items that were classified by the model.

When it is determined that the precision measure and/or the recall measure for the compliance model do not meet (i.e., are less than) the threshold precision measure and/or the threshold recall measure, respectively, a determination is made that the accuracy of the compliance model does not meet the accuracy threshold, and the compliance model continues to be trained with the training data (304). When it is determined that the precision measure and/or the recall measure for the compliance model do meet the threshold precision measure and/or the threshold recall measure, respectively, a determination is made that the accuracy of the compliance model meets the accuracy threshold.

In response to determining that the accuracy measure for the compliance model meets the accuracy threshold, unclassified content items are classified using the compliance model (308). The compliance model classifies content items as violating content items or complying content items using the feature values for the unclassified content items. Content items that are classified, with less than a threshold confidence, as either complying or violating content items can be re-classified as suspicious content items. Content items that are classified with less than a threshold confidence are referred to as having not been classified as either complying or violating content items.

For example, when the model is created using SVM techniques, a minimum distance from the hyperplane of the model can be specified as the threshold confidence. Model classification outputs that are within the threshold distance of the hyperplane are considered to not meet the threshold confidence (i.e., not classified as complying or violating), while model classification outputs that are outside of the threshold distance are considered to meet the threshold confidence (i.e., classified as violating or complying).

Data specifying the classifications of the content items are provided (310). In some implementations, the data can be stored, for example, in a data store (e.g., compliance data store 119 of FIG. 1) from which the data can be retrieved and/or further processed. In some implementations, the data can be associated with the content item that was classified. For example, a content item that was classified as a complying content item can be stored with data identifying the content item as a complying content item. Similarly, a content item that was classified as a violating content item can be stored with data identifying the content item as a violating content item. In some implementations, the data can be used to prevent violating content items from being distributed. For example, the set of content items that are selected as eligible content items for a particular request can be restricted to those content items that have not been classified as violating content items.

Suspicious content items are provided to raters for manual classification (312). As described above, the raters can be human raters that view the suspicious content items and classify the suspicious content items as either complying content items or violating content items. Once the suspicious content items have been classified, data specifying manual classifications of the suspicious content items are received (314). In some implementations, the data received specify whether each of the suspicious content items is a complying content item or a violating content item.

The compliance model is updated using the manual classifications of the suspicious content items and the feature values of the suspicious content items (316). In some implementations, an existing compliance model is updated by continuing to train the existing compliance model using the manual classifications and feature values of the suspicious content items as the training data.

A determination is made whether the updated compliance model has an updated accuracy measure that meets an updated accuracy threshold (318). In some implementations, the updated accuracy threshold is the same as the accuracy threshold that the compliance model originally met. In some implementations, the updated accuracy threshold is different than the accuracy threshold that was originally met by the compliance model.

In some implementations, determining whether the updated compliance model has an updated accuracy measure that meets an updated accuracy threshold can be performed by determining whether the updated accuracy measure meets the accuracy measure of the compliance model prior to the update. For example, an updated precision measure and/or an updated recall measure can be determined for the updated compliance model. In turn, these updated precision and/or updated recall measures can be compared to the precision and/or recall measures for the compliance model prior to being updated. When the updated precision and/or updated recall measures are not less than the precision and/or recall measures, respectively, a determination is made that the updated accuracy measure meets the accuracy measure. In turn, the updated compliance model is used to classify content items (320).

Continuing with the example above, when the updated precision and/or updated recall measures are less than the precision and/or recall measures, a determination is made that the updated accuracy measure does not meet the accuracy measure. In turn, the pre-update compliance model (i.e., the compliance model as it existed prior to the update) is used to classify content items (322). The pre-update compliance model and the updated compliance model can each provide suspicious content items to raters for manual classification (312), so that, irrespective of which of the models is used to classify content items, the compliance model can continue to be iteratively trained using the manually classified suspicious content items. Requiring an updated compliance model to have an updated accuracy measure that meets the accuracy measure of the compliance model before it was updated prevents a less accurate model from being used to classify content items.

Figure 4:
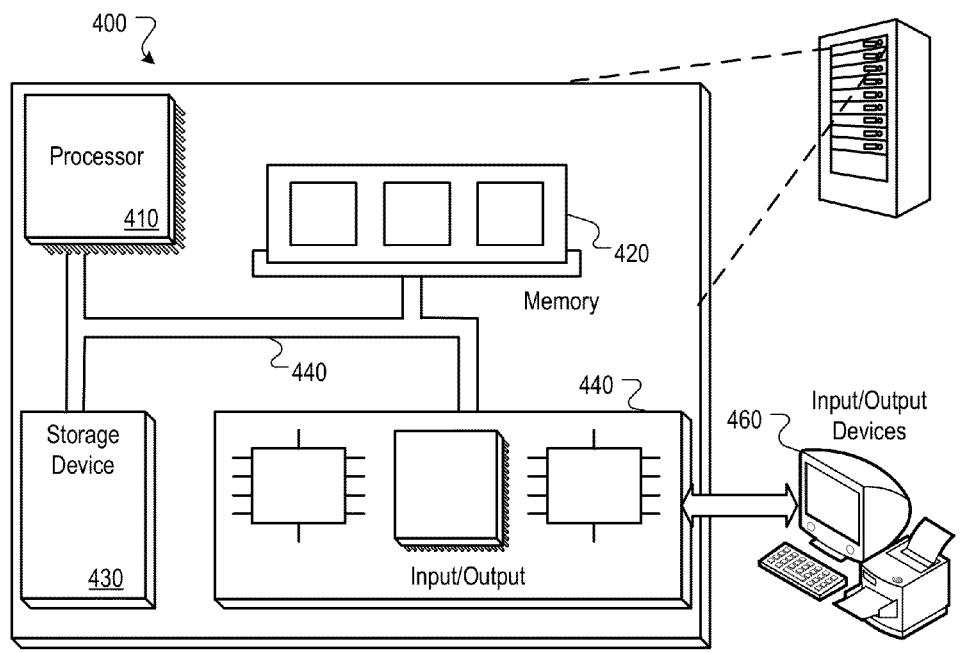
FIG. 4 is block diagram of an example computer system that can be used to train and update compliance models.

FIG. 4 is block diagram of an example computer system 400 that can be used to train and update compliance models, as described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus having memory, a processor, and code stored in the memory and executed in the processor, the method comprising:
    receiving by the processor training data that specify manual classifications of content items and feature values for each of the content items, the manual classification for each of the content items specifying whether the content item is a violating content item that violates content item distribution guidelines, the feature values specifying one or more characteristics of the content items and characteristics of landing pages to which the content items link;
    training by the processor a compliance model using the training data, the compliance model being trained to classify an unclassified content item as a violating content item based on the feature values of the unclassified content item;
    determining by the processor that the compliance model has an accuracy measure that meets a threshold accuracy measure;
    in response to determining that the accuracy measure for the compliance model meets the accuracy threshold, classifying by the processor unclassified content items using the feature values for the unclassified content items; and
    providing by the processor data specifying the classifications of the unclassified content items;
        wherein classifying unclassified content items comprises classifying at least one unclassified content item as a suspicious content item, and further comprising:
            providing the suspicious content item to a rater for manual classification;
            receiving data specifying a manual classification of the suspicious content item; and
            updating the compliance model using the manual classification and the feature values of the suspicious content item.

2. The method of claim 1, wherein receiving data specifying a manual classification comprises receiving data specifying that the suspicious content item is a violating content item or a complying content item.

3. The method of claim 1, further comprising:
    determining an updated accuracy measure for the updated compliance model;
    determining that the updated accuracy measure meets the accuracy measure for the compliance model; and
    in response to determining that the updated accuracy measure meets the accuracy measure, classifying content items using the updated compliance model.

4. The method of claim 3, wherein:
    determining that the compliance model has an accuracy measure that meets a threshold accuracy measure comprises:

determining that the compliance model has a precision measure that meets a precision threshold; and
determining that the compliance model has a recall measure that meets a recall threshold; and
determining that the updated accuracy measure meets the accuracy measure for the compliance model comprises:
determining that an updated precision measure for the updated compliance model meets the precision measure for the compliance model; and
determining that an updated recall measure for the updated compliance model meets the recall measure for the compliance model.

5. The method of claim 1, further comprising:
determining an updated accuracy measure for the updated compliance model;
determining that the updated accuracy measure does not meet the accuracy measure for the compliance model; and
in response to determining that the updated accuracy measure does not meet the accuracy measure, classifying content items using the compliance model.

6. The method of claim 1, wherein determining that the compliance model has an accuracy measure that meets the threshold accuracy measure comprises determining that the compliance model has at least a minimum area under a curve measure.

7. The method of claim 1, wherein determining that the compliance model has an accuracy measure that meets the threshold accuracy measure comprises determining that the compliance model has at least a minimum precision measure and at least a minimum recall measure.

8. The method of claim 1, wherein training a compliance model comprises, training a separate model for each of two different rules that are specified by the content distribution guidelines, each separate model being trained to classify the unclassified content item as a violating content item for one of the two different rules.

9. The method of claim 1, wherein the content items are advertisements that have been submitted for distribution by an advertisement management system and the landing pages are web pages to which the advertisements redirect users that interact with the advertisements.

10. The method of claim 1, further comprising preventing distribution of violating content items.

11. A non-transitory computer storage medium encoded with a computer program, the program comprising instructions that when executed by data processing apparatus cause the data processing apparatus to perform operations comprising:
receiving by the data processing apparatus training data that specify manual classifications of content items and feature values for each of the content items, the manual classification for each of the content items specifying whether the content item is a violating content item that violates content item distribution guidelines, the feature values specifying one or more characteristics of the content items and characteristics of landing pages to which the content items link;
training by the data processing apparatus a compliance model using the training data, the compliance model being trained to classify an unclassified content item as a violating content item based on the feature values of the unclassified content item;
determining by the data processing apparatus that the compliance model has an accuracy measure that meets a threshold accuracy measure;
in response to determining that the accuracy measure for the compliance model meets the accuracy threshold, classifying by the data processing apparatus unclassified content items using the feature values for the unclassified content items;
updating by the data processing apparatus the compliance model using the classifications of the unclassified content items; and
preventing by the data processing a apparatus violating content items from being distributed:
wherein classifying unclassified content items comprises classifying at least one unclassified content item as a suspicious content item, and further comprising:
providing the suspicious content item to a rater for manual classification;
receiving data specifying a manual classification of the suspicious content item; and
updating the compliance model using the manual classification and the feature values of the suspicious content item.

12. A system comprising:
a data store storing training data that specify manual classifications of content items and feature values for each of the content items, the manual classification for each of the content items specifying whether the content item is a violating content item that violates content item distribution guidelines, the feature values specifying one or more characteristics of the content items and characteristics of landing pages to which the content items link; and
one or more computers, each having a memory, a processor, and code stored in the memory and executable in the processor, the one or more computers being operable to interact with the data store and to cause the processor to perform operations including:
receiving the training data;
training a compliance model using the training data, the compliance model being trained to classify an unclassified content item as a violating content item based on the feature values of the unclassified content item;
determining that the compliance model has an accuracy measure that meets a threshold accuracy measure;
in response to determining that the accuracy measure for the compliance model meets the accuracy threshold, classifying unclassified content items using the feature values for the unclassified content items; and
providing data specifying the classifications of the unclassified content items;
wherein the one or more computers are further operable to perform operations including:
classifying at least one unclassified content item as a suspicious content item, and further comprising:
providing the suspicious content item to a rater for manual classification;
receiving data specifying a manual classification of the suspicious content item; and
updating the compliance model using the manual classification and the feature values of the suspicious content item.

13. The system of claim 12, wherein the one or more computers are further operable to perform operations including receiving data specifying that the suspicious content item is a violating content item or a complying content item.

14. The system of claim 12, wherein the one or more computers are further operable to perform operations including:
- determining an updated accuracy measure for the updated compliance model;
- determining that the updated accuracy measure meets the accuracy measure for the compliance model; and
- in response to determining that the updated accuracy measure meets the accuracy measure, classifying content items using the updated compliance model.

15. The system of claim 14, wherein the one or more computers are further operable to perform operations including:
- determining that the compliance model has a precision measure that meets a precision threshold;
- determining that the compliance model has a recall measure that meets a recall threshold;
- determining that an updated precision measure for the updated compliance model meets the precision measure for the compliance model; and
- determining that an updated recall measure for the updated compliance model meets the recall measure for the compliance model.

16. The system of claim 12, wherein the one or more computers are further operable to perform operations including:
- determining an updated accuracy measure for the updated compliance model;
- determining that the updated accuracy measure does not meet the accuracy measure for the compliance model; and
- in response to determining that the updated accuracy measure does not meet the accuracy measure, classifying content items using the compliance model.

17. The system of claim 12, wherein the one or more computers are further operable to perform operations including determining that the compliance model has at least a minimum area under a curve measure.

18. The system of claim 12, wherein the one or more computers are further operable to perform operations including determining that the compliance model has at least a minimum precision measure and at least a minimum recall measure.

19. The system of claim 12, wherein the one or more computers are further operable to perform operations including training a separate model for each of two different rules that are specified by the content distribution guidelines, each separate model being trained to classify the unclassified content item as a violating content item for one of the two different rules.

20. The system of claim 12, wherein the content items are advertisements that have been submitted for distribution by an advertisement management system and the landing pages are web pages to which the advertisements redirect users that interact with the advertisements.

21. The system of claim 12, wherein the one or more computers are further operable to perform operations including preventing distribution of violating content items.

* * * * *